US010215113B2

(12) United States Patent
Zhang et al.

(10) Patent No.: US 10,215,113 B2
(45) Date of Patent: Feb. 26, 2019

(54) METHOD AND DEVICE FOR OPERATING AN INTERNAL COMBUSTION ENGINE

(71) Applicant: CONTINENTAL AUTOMOTIVE GMBH, Hannover (DE)

(72) Inventors: Hong Zhang, Tegernheim (DE); Gerhard Eser, Hemau (DE)

(73) Assignee: Continental Automotive GMBH, Hannover (DE)

( * ) Notice: Subject to any disclaimer, the term of this patent is extended or adjusted under 35 U.S.C. 154(b) by 0 days.

(21) Appl. No.: 15/946,756

(22) Filed: Apr. 6, 2018

(65) Prior Publication Data

US 2018/0223747 A1 Aug. 9, 2018

Related U.S. Application Data

(63) Continuation of application No. PCT/EP2016/072148, filed on Sep. 19, 2016.

(30) Foreign Application Priority Data

Oct. 7, 2015 (DE) ........................ 10 2015 219 362

(51) Int. Cl.
*B60T 7/12* (2006.01)
*F02D 35/02* (2006.01)
(Continued)

(52) U.S. Cl.
CPC ....... *F02D 35/023* (2013.01); *F02D 41/0085* (2013.01); *F02D 41/1454* (2013.01);
(Continued)

(58) Field of Classification Search
CPC ... B60W 2510/0619; B60W 2710/0622; F02B 19/1052; F02B 19/1085; F02D 33/00; F02D 35/0046; F02D 41/0002; F02D 41/0052
(Continued)

(56) References Cited

U.S. PATENT DOCUMENTS

2008/0201057 A1 8/2008 Aliakbarzadeh et al.
2008/0221781 A1 9/2008 Kang et al.
(Continued)

FOREIGN PATENT DOCUMENTS

DE 10149434 A1 6/2003
DE 102005009101 B3 3/2006
(Continued)

OTHER PUBLICATIONS

International Search Report and Written Opinion dated Dec. 6, 2016 from corresponding International Patent Application No. PCT/EP2016/072148.

(Continued)

*Primary Examiner* — John Kwon

(57) ABSTRACT

A method for operating an internal combustion engine is presented in which a noise characteristic value, which is representative of a measurement of a noise of the measurement signal of a respective exhaust gas probe, is determined as a function of a profile of the measurement signal of the respective exhaust gas probe. A pressure characteristic value, which is assigned to a respective cylinder, is determined as a function of a profile of a measurement signal of a crankshaft angle sensor and a profile of a pressure measurement signal of a cylinder pressure sensor. Respective actuation signals for actuating respective injection valves are adapted as a function of the pressure characteristic value and the noise characteristic value assigned to the respective cylinder, for the purpose of approximating an air/fuel ratio in the individual cylinders.

15 Claims, 6 Drawing Sheets

(51) Int. Cl.
*F02D 41/00* (2006.01)
*F02D 41/14* (2006.01)
*F02D 41/28* (2006.01)

(52) U.S. Cl.
CPC ................ *F02D 2041/1409* (2013.01); *F02D 2041/286* (2013.01); *F02D 2041/288* (2013.01); *F02D 2200/02* (2013.01)

(58) Field of Classification Search
USPC ......... 701/103, 104, 110, 111, 114; 123/434, 123/673, 691
See application file for complete search history.

(56) References Cited

U.S. PATENT DOCUMENTS

| | | | | |
|---|---|---|---|---|
| 2008/0289599 | A1* | 11/2008 | Kurotani | F02D 19/081 123/304 |
| 2009/0164089 | A1 | 6/2009 | Youssef et al. | |
| 2010/0077728 | A1 | 4/2010 | Wang et al. | |
| 2012/0065868 | A1* | 3/2012 | Ando | F02D 41/221 701/103 |
| 2013/0180511 | A1 | 7/2013 | Hess et al. | |
| 2014/0257670 | A1* | 9/2014 | Tsuchiya | F02D 41/1401 701/102 |
| 2015/0239464 | A1* | 8/2015 | Ando | B60K 6/445 701/22 |

FOREIGN PATENT DOCUMENTS

| | | | |
|---|---|---|---|
| DE | 102005057975 | A1 | 6/2007 |
| DE | 102007002740 | A1 | 7/2008 |
| DE | 102008002424 | A1 | 6/2009 |
| DE | 112008000616 | T5 | 1/2010 |
| DE | 102008054215 | A1 | 5/2010 |
| DE | 102009043203 | A1 | 5/2010 |
| DE | 102010012140 | A1 | 9/2011 |
| DE | 102010038779 | A1 | 2/2012 |

OTHER PUBLICATIONS

German Office Action dated Apr. 19, 2016 for corresponding German Patent Application No. 10 2015 219 362.4.

* cited by examiner

METHOD AND DEVICE FOR OPERATING AN INTERNAL COMBUSTION ENGINE

CROSS REFERENCE TO RELATED APPLICATIONS

This application is a continuation of International application No. PCT/EP2016/072148, filed Sep. 19, 2016, which claims priority to German application No. 10 2015 219 362.4, filed on Oct. 7, 2015, each of which is hereby incorporated by reference herein in its entirety.

BACKGROUND

It is possible to make a contribution to keeping pollutant emissions during operation of an internal combustion engine as low as possible by keeping low the pollutant emissions which are produced during the combustion of the air/fuel mixture in the respective cylinders. On the other hand, exhaust gas after-treatment systems which convert the pollutant emissions which are generated in the respective cylinder during the combustion process of the air/fuel mixture into harmless substances are used in internal combustion engines.

For this purpose, exhaust gas catalytic converters are used which convert carbon monoxide, hydrocarbons and, if appropriate, nitrogen oxides into harmless substances.

Both the selective influencing of the generation of the pollutant emissions during the combustion and the conversion of the pollutant components with a high level of efficiency by means of an exhaust gas catalytic converter require a very precisely set air/fuel ratio in the respective cylinder.

DE 10 2005 009 101 B3 discloses a cylinder-specific lambda control system, wherein a cylinder-specific air/fuel ratio deviation is determined, which is then fed to a closed-loop controller whose output variable is a closed-loop controller value for influencing the air/fuel ratio in the respective cylinder. The closed-loop controller comprises an integral component.

DE 10 2008 002 424 A1 discloses a method for operating an internal combustion engine in which a combustion feature is determined, and one or more application functions for the operation of the internal combustion engine are carried out as a function of the combustion feature.

DE 10 2010 012 140 A1 discloses a method for operating an internal combustion engine, wherein a lambda actual value and a lambda setpoint value of an exhaust gas are determined in an exhaust gas tract of the internal combustion engine, wherein an instantaneous setpoint value and an instantaneous actual value for a torque output by the internal combustion engine are determined, and wherein a charge is fed per work cycle to the working cylinders of the internal combustion engine via an air system. Furthermore, the instantaneous setpoint value is compared with the instantaneous actual value, wherein a difference between the lambda actual value and the lambda setpoint value is determined when a difference between the instantaneous setpoint value and the instantaneous actual value undershoots a predetermined threshold value. At least one operating parameter of the internal combustion engine, which influences the charge, is changed as a function of the difference between the lambda actual value and the lambda setpoint value in such a way that the difference between the lambda actual value and the lambda setpoint value is minimized.

DE 10 149 434 A1 discloses a method for controlling the torque of an internal combustion engine, having the following method steps: measuring the time profile of the pressure in the combustion chamber of at least one cylinder of the internal combustion engine; measuring the time profile of the rotational angle of the crankshaft of the internal combustion engine; calculating the indicated work and an internal torque from the pressure and the rotational angle of the internal combustion engine; and controlling the torque output by the internal combustion engine as a function of the internal torque.

SUMMARY

The object on which the invention is based is to provide a method and a device for operating an internal combustion engine having a plurality of cylinders, which respectively make a contribution to low-pollution operation in a simple and reliable way.

One refinement of the invention is distinguished by a method and a corresponding device for operating an internal combustion engine. The internal combustion engine has a plurality of cylinders, which are each assigned an injection valve, and which are each assigned to a common exhaust gas probe which is arranged in or upstream of an exhaust gas catalytic converter in an exhaust gas tract and makes available a measurement signal. The internal combustion engine has a crankshaft angle sensor whose measurement signal is representative of a profile of a crankshaft angle of a crankshaft. The internal combustion engine has at least one cylinder pressure sensor whose pressure measurement signal is representative of a profile of a cylinder pressure in a combustion chamber of the internal combustion engine.

A noise characteristic value, which is representative of a measurement of a noise of the measurement signal of the respective exhaust gas probe, is determined as a function of a profile of the measurement signal of the respective exhaust gas probe. A pressure characteristic value, which is assigned to the respective cylinder, is determined as a function of a profile of the measurement signal of the crankshaft angle sensor and a profile of the pressure measurement signal of the cylinder pressure sensor. Respective actuation signals for actuating the respective injection valves are adapted as a function of the pressure characteristic value and the noise characteristic value assigned to the respective cylinder, for the purpose of approximating an air/fuel ratio in the individual cylinders.

The pressure characteristic value is, in particular, representative of a cylinder pressure and/or indicated work and/or an internal torque and/or of a difference between the cylinder pressure, the indicated work and/or the internal torque in relation to a mean value of cylinder pressure and/or indicated work and/or internal torque, for example a mean value of all the cylinders.

The noise characteristic value is determined, for example, taking into account the frequency spectrum of the measurement signal of the exhaust gas probe. For example, the noise characteristic value may be determined by means of a Fourier transformation, wherein a fast Fourier transformation, also abbreviated as FFT, is preferably used. In this context, a filter, which is embodied, for example, in the form of a bandpass filter is also preferably used. The filter is preferably configured in such a way that a frequency which correlates with the respective current rotational speed is included, in particular a frequency which correlates to a current, in particular approximately average, segment time period. In particular, it includes the fundamental frequency which is assigned to the respective average segment time period.

In this way, use is made of the realisation that the noise characteristic value is characteristic for an unequal apportionment of fuel to the individual cylinders. Furthermore, use is made of the realisation that by means of the pressure characteristic value it is possible to determine the direction of the required change in the injection, that is to say, for example in the direction of a lean adjustment or rich adjustment, since an increased pressure characteristic value is representative of an excessively high torque of a cylinder and therefore the injection mass has to be reduced and an excessively low pressure characteristic value is representative of an excessively low torque of a cylinder, and therefore the injection mass has to be increased. Therefore, a simple and reliable approximation of the air/fuel ratio in the individual cylinders is possible.

Therefore, with this procedure precise knowledge of a phase position or a time period of the measurement signal, which is decisive for the respective cylinder, of the exhaust gas probe is not absolutely necessary, which measurement signal is otherwise determined empirically and may be corrected by subsequent adaptation. This adaptation constitutes a particular challenge, particularly in the event of specific exhaust gas configurations, for example with an exhaust gas turbocharger, with markedly changing time periods of the measurement signal at the exhaust gas probe.

According to an advantageous refinement, the pressure characteristic value and the noise characteristic value are compared with a respective predefined threshold value. When the respective threshold value is exceeded, the respective actuation signals for actuating the respective injection valves are adapted.

According to a further advantageous refinement, the respective actuation signals for actuating the respective injection valves are adapted by means of a closed-loop control system.

According to a further advantageous refinement, the noise characteristic value is fed to the closed-loop controller on the input side.

According to a further advantageous refinement, the pressure characteristic value is fed to the closed-loop controller on the input side.

According to a further advantageous refinement, a multiplication of the noise characteristic value and the pressure characteristic value is fed to the closed-loop controller on the input side.

With such a closed-loop control system in which a multiplication of the noise characteristic value and the pressure characteristic value is used for a closed-loop control system, complete correction is carried out in the case of an injection error. If, however, a cylinder-selective fault occurs in the air path, the closed-control system cannot completely compensate the error, since complete operation of lambda=1 in the case of a cylinder-selective air error will always have a cylinder pressure deviation.

Therefore, it is additionally possible to differentiate between an error in the air path and an error in the fuel path by means of the closed-loop control system, since in the case of a continuously increased value of the noise characteristic value and/or of the pressure characteristic value there is an error in the air path.

According to a further advantageous refinement, a PI controller is used for the closed-loop control.

As a result of the provision of the PI controller, particularly efficient and effective adaptation of the respective actuation signal may take place.

According to a further advantageous refinement, a non-smooth running characteristic value which is assigned to the respective cylinder is determined as a function of a profile of the measurement signal of the crankshaft angle sensor. The respective actuation signals for actuating the respective injection valves are adapted as a function of the pressure characteristic value assigned to the respective cylinder, the noise characteristic value and the non-smooth running characteristic value assigned to the respective cylinder.

In this context it is advantageous if a degree of consideration of a closed-loop controller actuation signal of the PI controller for adapting the respective actuation signal for actuating the respective injection valve is determined, as a function of the non-smooth running characteristic value taking into account the degree of similarity of segment time periods of the respective cylinder in comparison with segment time periods of the other cylinders. In this way, particularly effective adaptation for the purpose of approximating the air/fuel ratios in the individual cylinders may take place.

Segment time periods denote here time periods of a respective cylinder segment, wherein a cylinder segment results from the crankshaft angle of a work cycle divided by the number of cylinders of the internal combustion engine. This results, for example, in the case of a four-stroke internal combustion engine with four cylinders, in a crankshaft angle of 720°:4, that is to say 180°.

BRIEF DESCRIPTION OF THE DRAWINGS

Exemplary embodiments of the invention will be explained in more detail hereinbelow by means of the schematic drawings.

In the figures.

DETAILED DESCRIPTION

Elements with the same design or function are characterized by the same reference symbols in all the figures.

Figure 1:
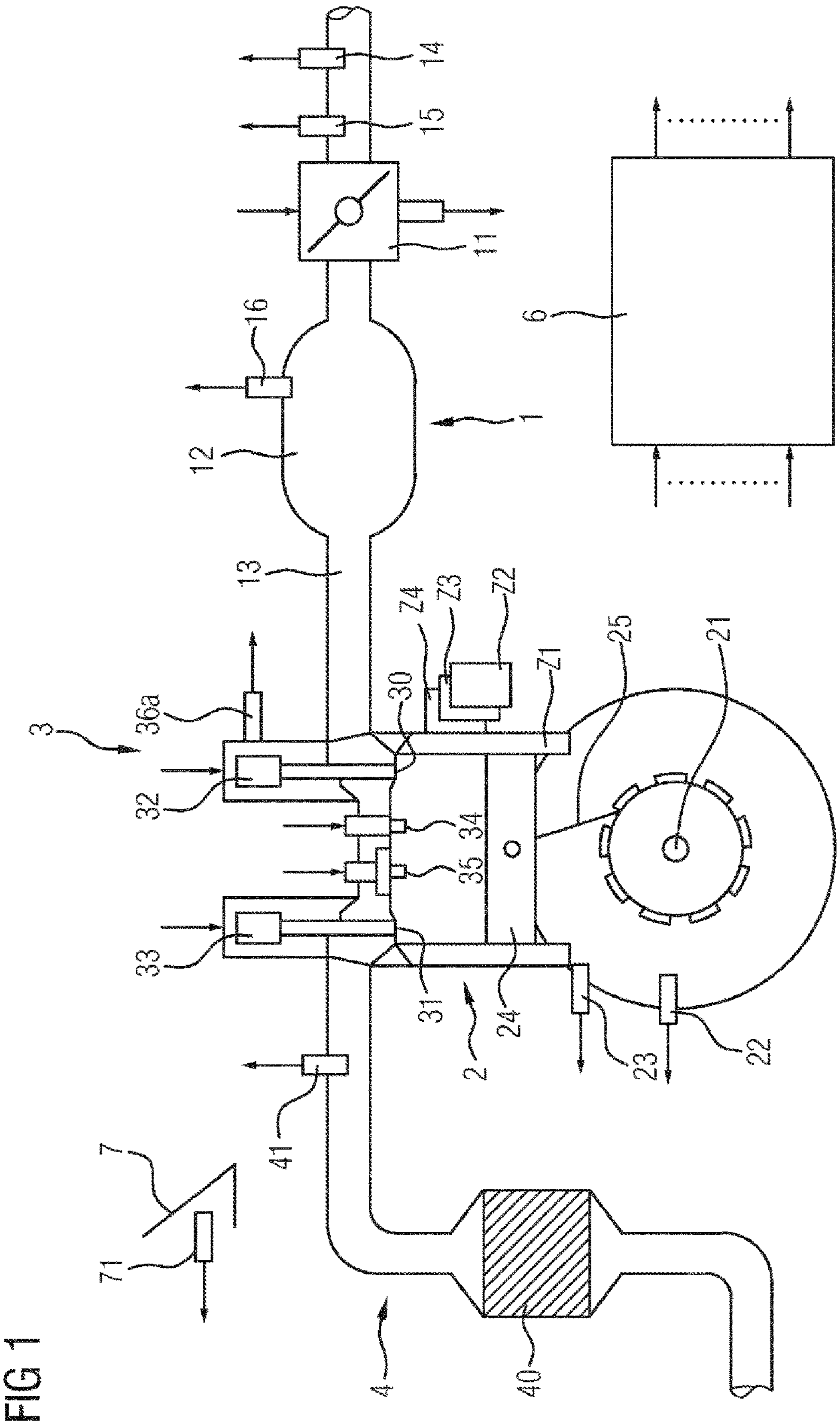
FIG. 1 shows an internal combustion engine with a control device.

An internal combustion (FIG. 1) includes an intake tract 1, an engine block 2, a cylinder head 3 and an exhaust gas tract 4. The intake tract 1 preferably includes a throttle valve 11, and in addition a manifold 12 and an intake pipe 13, which is fed towards a cylinder Z1 via an intake duct into the engine block 2. The engine block 2 also comprises a crankshaft 21 which is coupled via a connecting rod 25 to the piston 24 of the cylinder Z1.

The cylinder head 3 includes a valve drive with a gas inlet valve 30, a gas outlet valve 31 and valve drives 32, 33. The cylinder head 3 also includes an injection valve 34 and a spark plug 35. Alternatively, the injection valve 34 may also be arranged in the intake tract 1.

The exhaust gas tract 4 includes an exhaust gas catalytic converter 40, which is preferably embodied as a three-way catalytic converter.

A control device 6 is provided, to which sensors which detect various measurement variables and determine the measured values of the measurement variable are assigned. Operational variables include not only the measurement variables but also variables derived therefrom. By generating actuation signals for the actuator drives, the control device 6 actuates, as a function of at least one of the operating variables, the actuator elements which are assigned to the internal combustion engine and to which corresponding actuator drives are assigned in each case.

The control device 6 may also be referred to as a device for operating the internal combustion engine.

The sensors are a pedal position encoder 71, which detects the position of an accelerator pedal 7, an air mass flow rate meter 14 which detects an air mass flow rate upstream of the throttle valve 11, a temperature sensor 15 which detects an intake air temperature, a pressure sensor 16 which detects the intake pipe pressure, at least one cylinder pressure sensor whose pressure measurement signal is representative of a profile of a cylinder pressure in a combustion chamber of the internal combustion engine, a crankshaft angle sensor 22 which detects a crankshaft angle, to which a rotational speed is then assigned, a torque sensor 23 which detects a torque of the crankshaft 21, a camshaft angle sensor **36*a* which detects a camshaft angle, and an exhaust gas probe 41 which detects a residual oxygen content of the exhaust gas and whose measurement signal MS_A is characteristic of the air/fuel ratio in the cylinder Z1 during the combustion of the air/fuel mixture. The exhaust gas probe 41** is embodied, for example, as a lambda probe, particularly as a linear lambda probe, and generates, if it is embodied as a linear lambda probe, a measurement signal which is proportional to the air/fuel ratio over a wide relevant range of said air/fuel ratio.

A plurality of cylinder pressure sensors may also be provided, for example one cylinder pressure sensor per cylinder.

The measurement signal of the crankshaft angle sensor 22 is therefore representative of a profile of the crankshaft angle of the crankshaft 21. An encoder wheel with teeth is arranged on the crankshaft 21 and assigned to the crankshaft angle sensor 22, with the result that tooth times may be determined as a function of the measurement signal of the crankshaft angle sensor 22.

Depending on the refinement, any desired subset of the specified sensors may be present, or additional sensors may also be present.

The actuator elements are, for example, the throttle valve 11, the gas inlet and gas outlet valves 30, 31, the injection valve 34 or the spark plug 35.

In addition to the cylinder Z1, other further cylinders Z2 to Z4 are also provided, and corresponding actuator elements may then also be assigned thereto. Each exhaust gas bank of cylinders, which can also be referred to as a cylinder bank, is respectively assigned an exhaust gas section of the exhaust gas tract 4, and in each case an exhaust gas probe 41 is correspondingly assigned to the respective exhaust gas section.

The control device 6 may include a computing unit and a memory for storing data and programs. In order to operate the internal combustion engine, a program for operating the internal combustion engine is stored in the control device 6, which program may be run in the computing unit during operation. The program implements, by means of software, the block circuit diagram described below with reference to FIGS. 2, 3 and 4.

The program for operating the internal combustion engine is started, particularly, close in time to an engine start of the internal combustion engine in a step S1.

In a step S3, the measurement signal MS_A of the exhaust gas probe 41 is made available. A noise characteristic value RM, which is representative of a measurement of a noise of the measurement signal MS_A of the respective exhaust gas probe 41, is determined as a function of a profile of the measurement signal MS_A of the respective exhaust gas probe.

The noise characteristic value RM may be determined in a particularly easy way by, for example, taking into account a summing of jumps in the measurement signal MS_A of the exhaust gas probe 41 over a respectively predefined time period.

The noise characteristic value RM may be determined particularly well by means of a Fourier transformation, wherein a fast Fourier transformation, also abbreviated as FFT, is used. In this context, a filter, which is embodied, for example, in the form of a bandpass filter, is also used. The filter is configured in such a way that a frequency which correlates with the respective current rotational speed is included, in particular a frequency which correlates with a current, in particular approximately in an average, segment time period. In particular, the frequency includes the fundamental frequency which is assigned to the respective average segment time period.

The noise characteristic value RM is determined, therefore, by taking into account the frequency spectrum of the measurement signal MS_A of the exhaust gas probe 41.

In this context, in particular, use is made of the realization that an amplitude in the region of the above-mentioned fundamental frequency of the Fourier transformed exceeds a predefined threshold value when there are unequal air/fuel ratios in the respective cylinders Z1 to Z4. Therefore, the amplitude in the region of the fundamental frequency may be used, for example, in particular decisively, to determine the noise characteristic value RM.

In a step S5, a profile of the measurement signal of the crankshaft angle sensor 22 and a profile of the pressure measurement signal of the cylinder pressure sensor are made available. A pressure characteristic value DM, which is assigned to the respective cylinder Z1, Z2, Z3, Z4, is determined as a function of the profile of the measurement signal of the crankshaft angle sensor 22 and the profile of the pressure measurement signal of the cylinder pressure sensor.

The pressure characteristic value DM is, in particular, representative of a cylinder pressure and/or indicated work and/or an internal torque and/or of a difference between the cylinder pressure, the indicated work and/or the internal torque and a mean value of cylinder pressure and/or indicated work and/or internal torque, for example a mean value of all the cylinders.

In a step S7, respective actuation signals for actuating the respective injection valves 34 are adapted as a function of the pressure characteristic value DM and the noise characteristic value RM assigned to the respective cylinder Z1, Z2, Z3, Z4, for the purpose of approximating an air/fuel ratio in the individual cylinders Z1, Z2, Z3, Z4.

In a step S9, the program is ended and may, if appropriate, be started again in the step S1.

Figure 3:
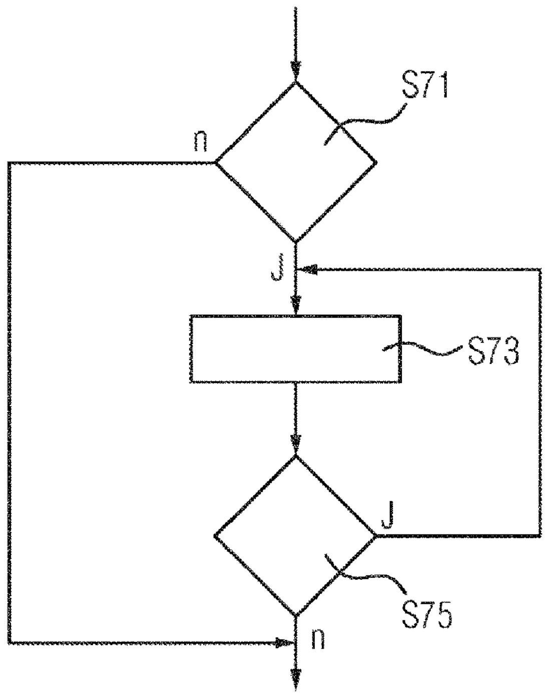
FIG. 3 shows a further block diagram of the control device.

The step S7 is, for example, divided into steps S71, S73 and S75 (FIG. 3).

Figure 2:
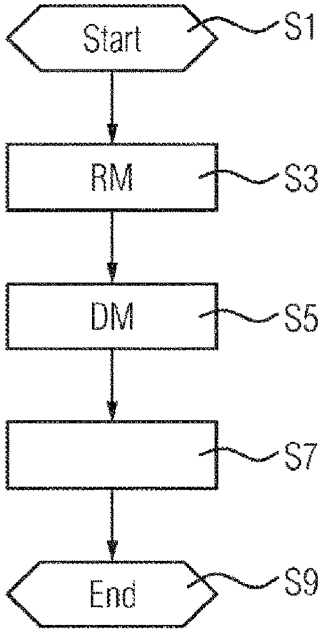
FIG. 2 shows a block diagram of the control device.

In the step S71, the pressure characteristic value DM and the noise characteristic value RM are compared with a respective predefined threshold value. When the respective threshold value is exceeded, the program is continued in the step S73. If the respective threshold value is not exceeded, the program is continued in a step S9 (FIG. 2).

In the step S73, the respective actuation signals for actuating the respective injection valves 34 are adapted.

In the step S75, the pressure characteristic value DM and the noise characteristic value RM are compared again with a respective predefined threshold value. When the respective threshold value is exceeded, the program is continued in the step S73. If the respective threshold value is not exceeded, the program is continued in a step S9 (FIG. 2).

Figure 4:
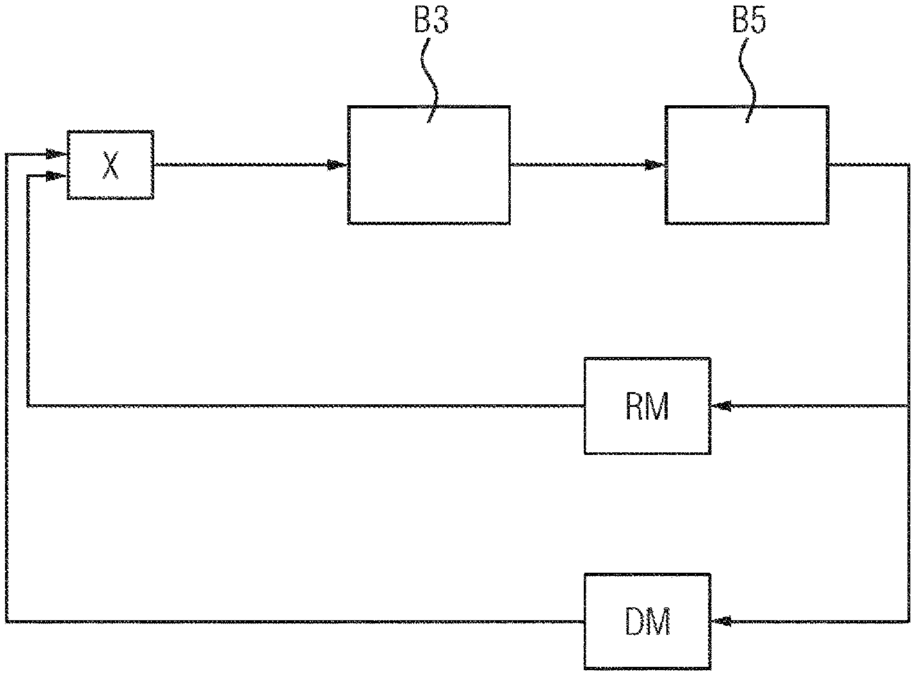
FIG. 4 shows a further block diagram of the control device.

The respective actuation signals for actuating the respective injection valves 34 are adapted, for example, by means of a closed-loop control system (FIG. 4).

A multiplication of the noise characteristic value RM and pressure characteristic value DM is fed to the block B3, in which a closed-loop controller, in particular a PI controller, is embodied. Alternatively, the pressure characteristic value DM, and/or the noise characteristic value RM, can also be fed to the closed-loop controller on the input side.

The block B5 stands for the controlled system that is in particular the injection system and the internal combustion engine.

This includes the multipliers.

With such a closed-loop control system in which a multiplication of the noise characteristic value RM and pressure characteristic value DM is used for a closed-loop control system, complete correction is carried out in the case of an injection error. If, however, a cylinder-selective fault occurs in the air path, the closed-loop control system cannot completely compensate the fault, since complete operation of lambda=1 in the case of a cylinder-selective air fault will always have a cylinder pressure deviation.

Therefore, it is additionally possible to differentiate between an air fault and a fuel fault by means of the closed-loop control system, since in the case of a continuously increased value of the noise characteristic value RM and/or of the pressure characteristic value DM there is an air fault.

In addition to the noise characteristic value RM and the pressure characteristic value DM, a non-smooth running characteristic value, assigned to the respective cylinder Z1, Z2, Z3, Z4, may be used to adapt the respective actuation signals for actuating the respective injection valves 34. The non-smooth running characteristic value is determined as a function of a profile of the measurement signal of the crankshaft angle sensor 22.

The non-smooth running characteristic value is, in particular, representative of a degree of similarity of segment time periods which is to the respective cylinder in comparison with segment time periods of the other cylinders. In this context, for example what are referred to as tooth times may be analysed or else a rotational speed gradient may be analysed.

For example, the non-smooth running characteristic value is determined in such a way that it is characteristic of a direction of a degree of similarity of segment time periods of the respective cylinders Z1 to Z4 in comparison with segment time periods of the other cylinders Z1 to Z4. The direction is represented here, particularly, by a sign, that is to say a plus or minus.

Furthermore, the non-smooth running characteristic value is determined, for example, in such a way that it is characteristic of a relevance of adaptation of the respective actuation signal for actuating the respective injection valve. The relevance has, in particular, either a relevance value, that is to say, for example, a neutral value such as 1, or an irrelevance value, that is say, for example, a get-out value such as 0.

Furthermore, the non-smooth running value is determined, for example, in such a way that, within a predefined range of the degree of similarity of segment time periods of the respective cylinder Z1 to Z4 in comparison with segment time periods of the other cylinders Z1 to Z4, its relevance has an irrelevance value.

Therefore, the non-smooth running characteristic value may have, for example, the discrete values +1, 0 and −1. Alternatively or additionally, the non-smooth running characteristic value may also have the unit us, since the degree of similarity may also be specified as a deviation of the segments from one another.

Figure 5A:
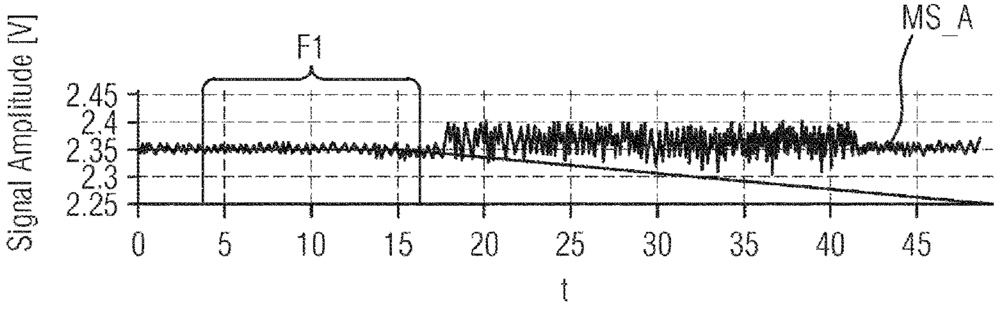
FIGS. 5A and 5B show first signal profiles.
Figure 5B:
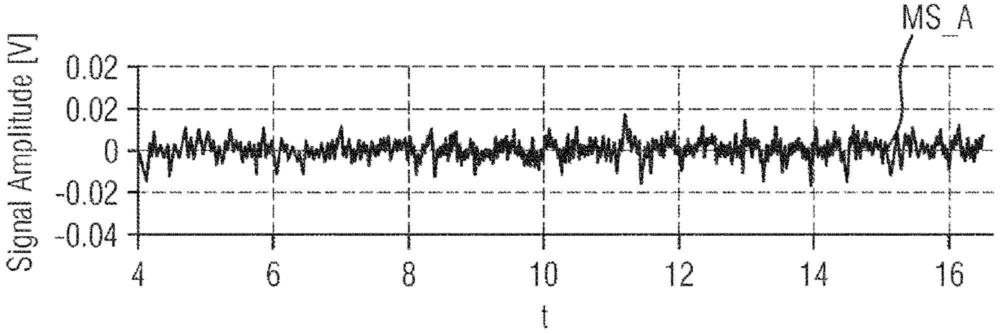

In FIGS. 5A and 5B, profiles of the measurement signal MS_A are represented, wherein the FIG. 5B represents a first window region F1 of the signal according to FIG. 5A with more precise chronological resolution. The signal profiles in FIGS. 5A and 5B are plotted over the time t. The ordinate in FIGS. 5A and 5B is a voltage in each case.

Figure 5C:
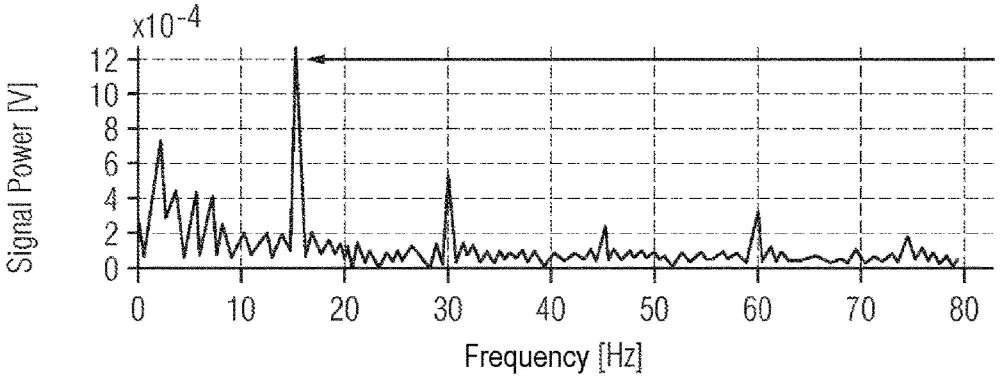
FIG. 5C shows a frequency spectrum assigned to the first signal profiles.

In FIG. 5C a frequency spectrum of the first window region F1 is illustrated, wherein the abscissa is the frequency, and the ordinate is, in particular, a voltage or may be a signal power. The ordinate can also represent a current.

In the first window region F1, there is no relevant unequal distribution of the air/fuel mixture in the respective cylinders. The fundamental oscillation corresponding to the current segment time period occurs here in the region of approximately 15 Hz, and the amplitude of the frequency spectrum is in this region, for example, $12\times10^{-4}$ V.

Figure 6A:
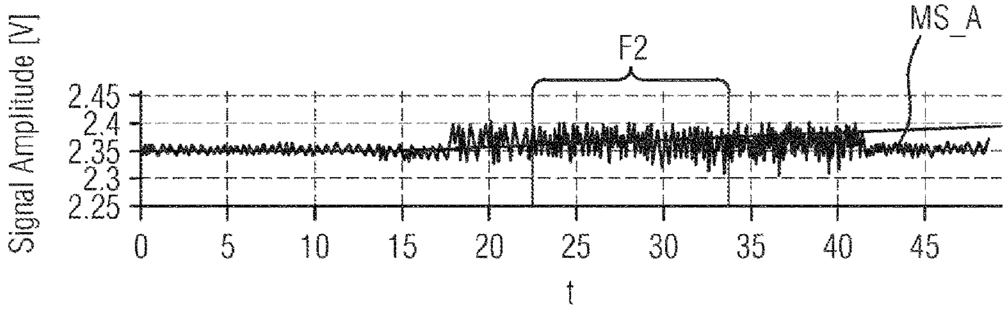
FIGS. 6A and 6B show second signal profiles.
Figure 6B:
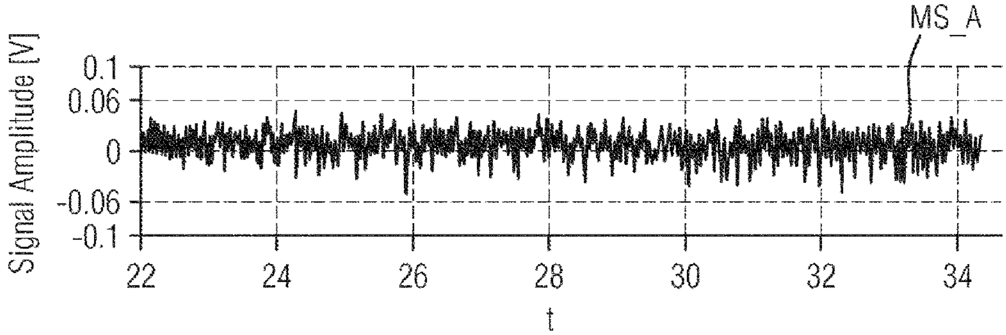

FIG. 6A illustrates again the profile of the measurement signal MS_A of the exhaust gas probe 41, and in FIG. 6B the signal profile with greater chronological resolution within a second window region F2 (see also FIG. 6A) is illustrated.

Figure 6C:
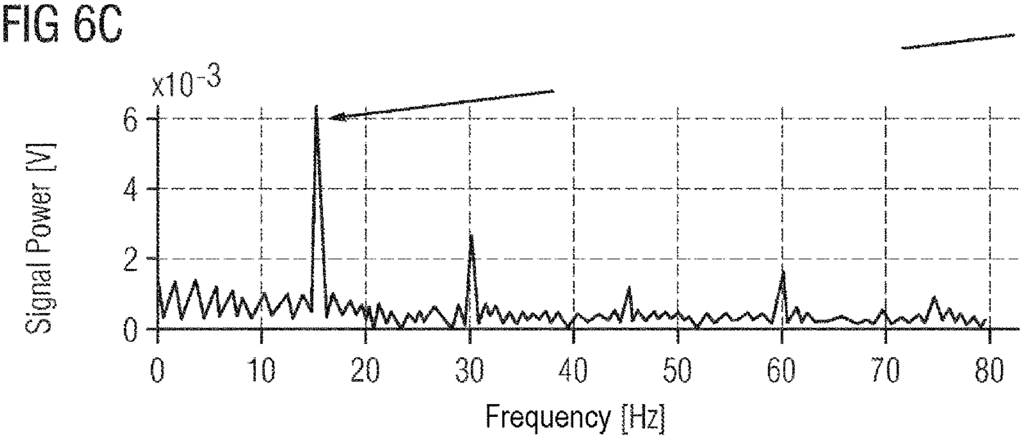
FIG. 6C shows a frequency spectrum assigned to the second signal profiles.

In FIG. 6C the frequency spectrum is plotted with respect to the second frequency range F2 of the measurement signal MS_A of the exhaust gas probe 41 corresponding to FIG. 5C. In this example, the fundamental frequency, which corresponds to the respective current segment time period, is also in the region of 15 Hz. However, trimming of the injection occurs in the vicinity of the second window region, with the result that unequal distribution of the air/fuel ratio is present in the individual cylinders. The fundamental frequency also corresponds in each case to the ignition frequency.

It is clearly apparent that the amplitude of the frequency spectrum in the region of the fundamental frequency in the case in FIG. 6C is significantly higher, specifically by approximately a factor of 50 in comparison with FIG. 5C, wherein here, for example, an unequal distribution of 10% has been set between the cylinders. Therefore, for example one cylinder is adjusted by −10% and the other by +10% with respect to its air/fuel ratio.

In a particularly simple refinement, the noise characteristic value RM is determined, for example, as a function of the amplitude of the frequency spectrum in the region of the fundamental frequency.

Figure 7:
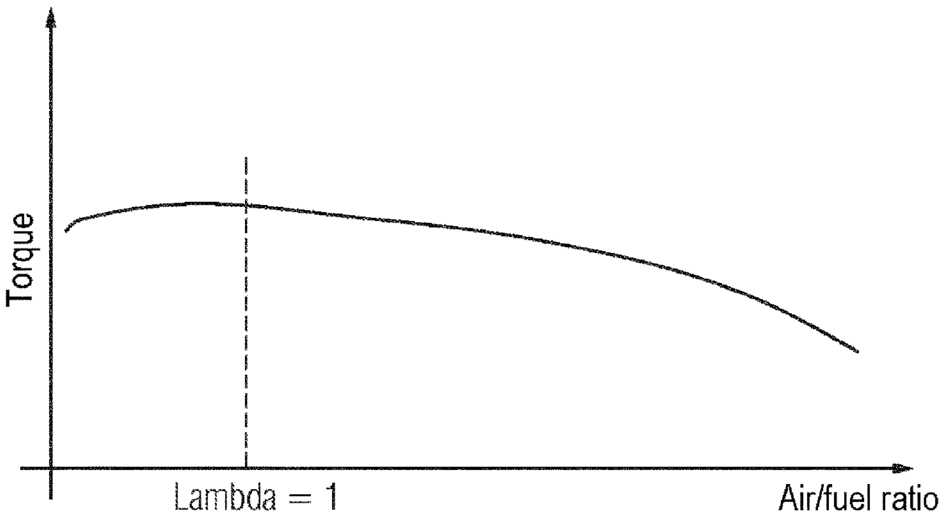
FIG. 7 shows a schematic relationship between the torque and lambda.

It has become apparent that, in particular in the case of internal combustion engines which are operated with gasoline and, in particular in a homogenous operating mode, this is say are operated in particular with an air/fuel ratio, in the vicinity of the value $\lambda=1$, the combination of taking into account the noise characteristic value RM and the pressure characteristic value DM and, if appropriate, the non-smooth running characteristic value permits particularly precise adaptation of the actuation signal for the injection in the respective cylinders Z1 to Z4, in particular since in an internal combustion engine which is operated with gasoline and in the vicinity of the stoichiometric air/fuel ratio, the relationship between the fuel mass flow rate and the torque is not particularly pronounced in the vicinity of the stoichiometric air/fuel ratio. Furthermore, when a linear lambda probe is used as an exhaust gas probe 41, there is no longer any jumping behavior around the stoichiometric air/fuel ratio, and a difference in the measurement signal MS_A in the case of an unequal distribution of the air/fuel ratio is therefore not very pronounced (see FIG. 7).

The procedure specified above provides the possibility of using the measurement signal MS_A of the exhaust gas probe 41 for determining the unequal distribution of the air/fuel ratio, without having to precisely determine the precise assignment to the cylinder injection or cylinder charge. Therefore, if appropriate, it is possible to dispense with active adjustment, as in what is referred to as the Cybl_Hom method, which is described, for example, in DE 10 2006 026 390 A1 or with adaptation of the phase shift. In addition, cylinder-specific lambda control is possible in a very precise way under more unfavorable exhaust gas configurations, such as, for example, with an exhaust gas turbocharger.

LIST OF REFERENCE DESIGNATIONS

1 Intake tract
11 Throttle flap
12 Manifold
13 Intake pipe
14 Air mass flow rate sensor
15 Temperature sensor
16 Intake pipe pressure sensor
2 Engine block
21 Crankshaft
22 Crankshaft angle sensor
23 Torque sensor
24 Piston
25 Connecting rod
3 Cylinder head
30 Gas inlet valve
31 Gas outlet valve
32, 33 Valve drive
34 Injection valve
35 Spark plug
36 Camshaft
**36*a*** Camshaft angle sensor
4 Exhaust-gas tract
40 Exhaust gas catalytic converter
41 Exhaust gas probe
6 Control device
7 Accelerator pedal
71 Pedal position encoder
Z1-Z4 Cylinders
MS_A Measurement signal of the exhaust gas probe
DM Pressure characteristic value
RM Noise characteristic value
B3-B5 Block
F1 First window region
F2 Second window region
t Time
f Frequency

The invention claimed is:

1. A method for operating an internal combustion engine, comprising:

providing a common exhaust gas probe which is arranged in or upstream of an exhaust gas catalytic converter in an exhaust gas tract associated with the internal combustion engine, the common gas probe making available a measurement signal, providing a plurality of cylinders, which are each assigned an injection valve, and which are each assigned to the common exhaust gas probe, providing a crankshaft angle sensor whose measurement signal is representative of a profile of a crankshaft angle of a crankshaft of the internal combustion engine, and providing at least one cylinder pressure sensor whose pressure measurement signal is representative of a profile of a cylinder pressure in a combustion chamber of the internal combustion engine, determining a noise characteristic value, which is representative of a measurement of a noise of the measurement signal of the exhaust gas probe, as a function of a profile of the measurement signal of the exhaust gas probe, determining, for at least one cylinder, a pressure characteristic value, which is assigned to the respective cylinder, as a function of a profile of the measurement signal of the crankshaft angle sensor and a profile of the pressure measurement signal of the cylinder pressure sensor associated with the at least one cylinder, and adapting respective actuation signals for actuating the respective injection valves as a function of the pressure characteristic value and the noise characteristic value assigned to the respective cylinder, for the purpose of approximating an air/fuel ratio in the individual cylinders.

2. The method as claimed in claim 1, further comprising comparing each of the pressure characteristic value and the noise characteristic value with a respective predefined threshold value, and when the respective threshold value is exceeded, adapting the respective actuation signals for actuating the respective injection valves is performed.

3. The method as claimed in claim 1, wherein the respective actuation signals for actuating the respective injection valves are adapted by a closed-loop controller.

4. The method as claimed in claim 3, wherein the noise characteristic value is fed to the closed-loop controller on an input side thereof.

5. The method as claimed in claim 3, wherein the pressure characteristic value is fed to the closed-loop controller on an input side thereof.

6. The method as claimed in claim 3, further comprising multiplying the noise characteristic value and the pressure characteristic value and providing a product of the multiplication to the closed-loop controller on an input side thereof.

7. The method as claimed in claim 3, wherein the closed-loop controller comprises a PI controller.

8. The method as claimed in claim 1, further comprising determining a non-smooth running characteristic value which is assigned to the respective cylinder as a function of a profile of the measurement signal of the crankshaft angle sensor, wherein adapting the respective actuation signals for actuating the respective injection valves as a function of the pressure characteristic value assigned to the respective cylinder, the noise characteristic value and the non-smooth running characteristic value assigned to the respective cylinder.

9. A device for controlling an internal combustion engine, the internal combustion engine including a plurality of cylinders, each of which is assigned to an injection valve, an exhaust gas tract having a common exhaust gas probe, a crankshaft angle sensor which generates a measurement signal is representative of a profile of a crankshaft angle of a crankshaft of the internal combustion engine, and at least one cylinder pressure sensor whose pressure measurement signal is representative of a profile of a cylinder pressure in a combustion chamber of the internal combustion engine, the device configured to:

determine a noise characteristic value, which is representative of a measurement of a noise of the measurement signal of the exhaust gas probe, as a function of a profile of the measurement signal of the exhaust gas probe, determine, for at least one cylinder, a pressure characteristic value, which is assigned to the respective cylinder, as a function of a profile of the measurement signal of the crankshaft angle sensor and a profile of the pressure measurement signal of the cylinder pressure sensor associated with the at least one cylinder, and adapt respective actuation signals for actuating the respective injection valves as a function of the pressure characteristic value and the noise characteristic value assigned to the respective cylinder, for approximating an air/fuel ratio in the individual cylinders.

10. The device of claim 9, wherein the device compares each of the pressure characteristic value and the noise characteristic value with a respective predefined threshold value, and when the respective threshold value is exceeded, the device adapts the respective actuation signals for actuating the respective injection valves.

11. The device of claim 9, wherein the device comprises a closed-loop controller.

12. The device of claim 11, wherein the noise characteristic value is fed to the closed-loop controller on an input side thereof.

13. The device of claim 11, wherein the pressure characteristic value is fed to the closed-loop controller on an input side thereof.

14. The device of claim 11, wherein the device multiplies the noise characteristic value and the pressure characteristic value and provides a product of the multiplication to the closed-loop controller on an input side thereof.

15. The device of claim 9, wherein the device is further configured to determine a non-smooth running characteristic value which is assigned to the respective cylinder as a function of a profile of the measurement signal of the crankshaft angle sensor, wherein the device adapts the respective actuation signals for actuating the respective injection valves as a function of the pressure characteristic value assigned to the respective cylinder, the noise characteristic value and the non-smooth running characteristic value assigned to the respective cylinder.

* * * * *